United States Patent Office

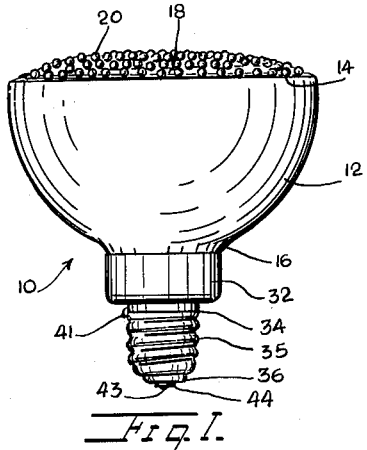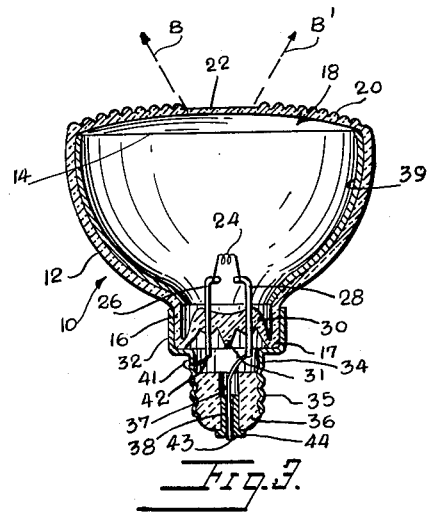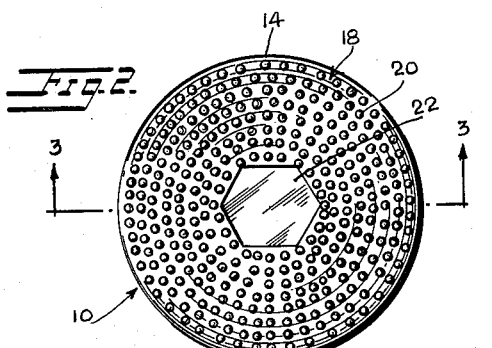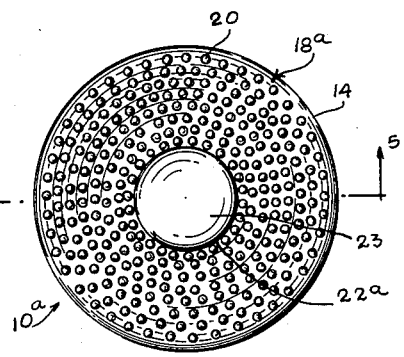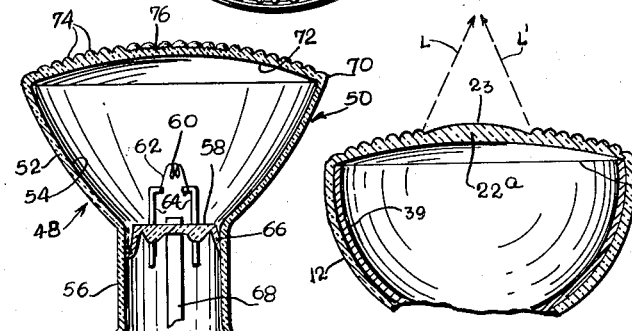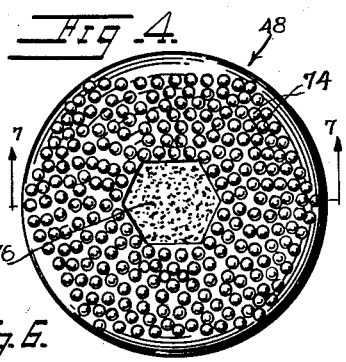
INVENTOR.
HOWARD GOODMAN
BY
ATTORNEY

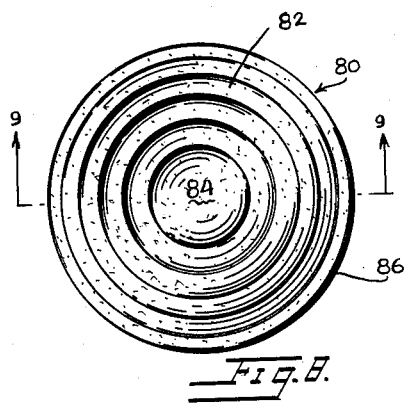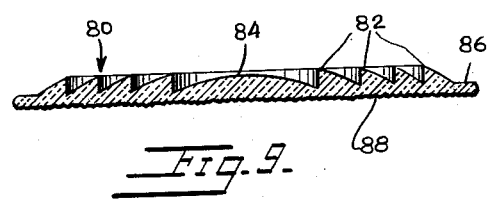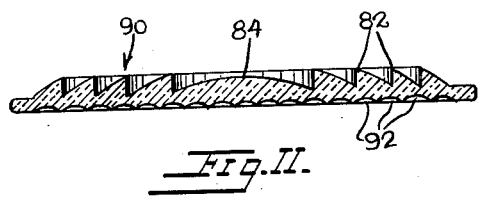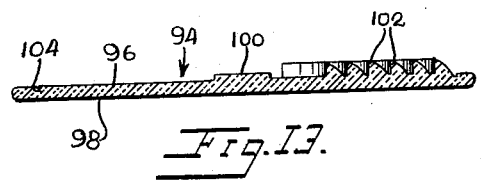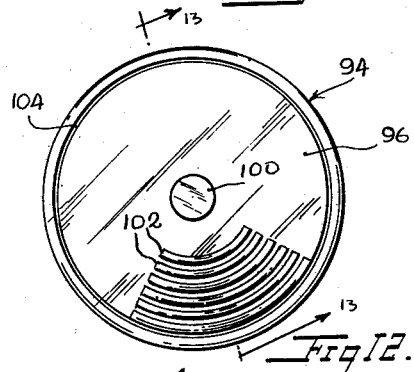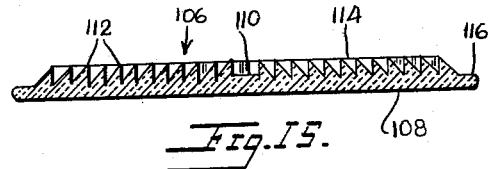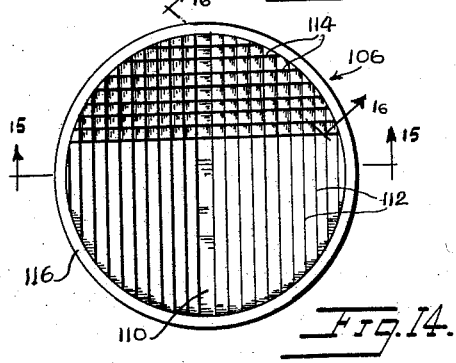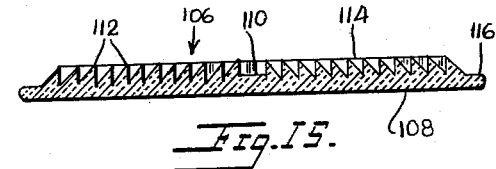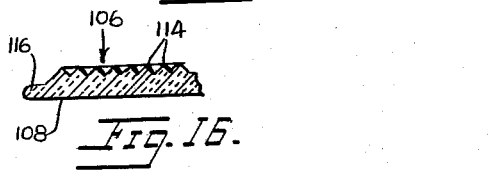

3,136,913
Patented June 9, 1964

3,136,913
SEALED ELECTRIC LAMP HAVING ENVELOPE
WITH LIGHT DIFFUSING AND FOCUSING
CHARACTERISTICS
Howard Goodman, 63 E. 9th St., New York, N.Y.
Filed Aug. 18, 1961, Ser. No. 132,478
3 Claims. (Cl. 313—111)

This invention concerns a sealed electric floodlamp.

According to the invention there is provided a sealed glass envelope internally coated with a reflecting metal film. The envelope may be a partial paraboloid, ellipsoid or the like. Integral with the wide end of the envelope is a transparent end face. This face is formed with a plurality of small enlarging lenses arranged in an annular array around the center of the face. The center of the face is clear and may be hexagonal, square, circular or have some other geometrical shape. The center of the face may be convex to define a lens with a large radius of curvature, much larger than the radius of curvature of the individual lenses around the periphery of the end face. The envelope has a narrow end on which is engaged a suitable plug assembly for insertion in a lamp fixture.

It is therefore one object of the invention to provide an improved electric lamp structure, including a sealed glass envelope having a transparent face formed with an annular array of small lenses and a central clear area.

Another object is to provide a lamp structure as described, wherein the central clear area may be a lens having a radius of curvature larger than the radius of curvature of the small lenses.

A further object according to a modification of the invention is to provide an improved electric lamp structure, including a sealed glass envelope having a transparent face formed with a series of annular lenses, a central clear area on the same face, the other face being roughened.

Still another object according to a further modification is to provide an improved electric lamp structure, including a sealed glass envelope having a transparent face formed with elongated criss-crossed protuberances forming lenses.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a lamp embodying the invention.

FIG. 2 is a top plan view of the lamp.

FIG. 3 is a sectional view taken on line 3—3 of FIG. 2.

FIG. 4 is a top plan view of another lamp according to the invention.

FIG. 5 is a fragmentary sectional view taken on line 5—5 of FIG. 4.

FIG. 6 is a view similar to FIG. 2 showing another modified form of lamp.

FIG. 7 is a cross-sectional view taken on the line 7—7 of FIG. 6, showing the lamp partially formed.

FIG. 8 is a top plan view of a modified form of lens for the lamps of FIGS. 1 and 7.

FIG. 9 is a cross-sectional view taken on the line 9—9 of FIG. 8.

FIG. 10 is a view similar to FIG. 8 of still another modified form of lens.

FIG. 11 is a cross-sectional view taken on the line 11—11 of FIG. 10.

FIG. 12 is a view similar to FIG. 8 of yet a further modified form of lens.

FIG. 13 is a cross-sectional view taken on the line 13—13 of FIG. 12.

FIG. 14 is a view similar to FIG. 8 of a still further modified form of lens.

FIG. 15 is a cross-sectional view taken on the line 15—15 of FIG. 14.

FIG. 16 is a sectional view taken on the line 16—16 of FIG. 14.

Referring to FIGS. 1–3, there is shown a lamp 10, including a flaring glass envelope 12 having a wide end 14 and a narrow neck end 16. At the wide end is integrally formed a circular lens or face 18 which is convex externally and concave internally. The external side of the end face is integrally formed with a plurality of projections defining small convex lenses 20 arranged in an annular array extending from the periphery of the face inwardly to the perimeter of a central clear area 22. The clear area is shown hexagonal, but it may be square, circular, triangular or have some other geometrical shape.

Internally of the envelope at the focus of the envelope which is partially paraboloid, ellipsoid or the like, is a filament 24 made of tungsten wire or the like. The filament is supported on two conductive stems 26, 28 spaced apart and extending through a glass neck closure 30. The neck closure is snugly and securely fitted to a plug assembly including a cylindrical skirt 32 of a metal shell 34. This shell is formed with a screw thread 35 for inserting and securing the lamp in a socket of a lamp fixture.

An insulator 36 is axially disposed in the shell. Extending axially in a bore 37 in the insulator is a hollow metal stem 38. Wire 42 connects stem 26 to the shell 34. Stem 38 terminates in a head 44 serving as a conductive terminal for the lamp. Wire 40 extends through stem 38 and is soldered to head 44 at 43.

The internal surface of the envelope is coated with a film 39 of a metal such as aluminum and serves to reflect light emitted by the incandescent filament 24 to the end face 18.

In manufacture of the lamp, the closure 30 may be a separate disk in which is inserted the stems 26, 28 carrying the filament 24. The periphery of the closure may be fused to the circular end 17 of neck 16 so that the closure forms a reentrant portion extending inside the neck, as clearly shown in FIG. 3. The metal coating will be applied to the inside of the envelope before the closure 30 is applied. The closure will have a central open nipple through which the envelope can be exhausted of air and then nitrogen or other gas may be admitted to the envelope. Thereafter, the nipple will be closed off leaving a sealed central tip 31. Thereafter the plug assembly will be attached to the neck of the envelope. Wire 42 will be soldered to the shell at a hole therein closed by solder 41. Wire 40 will be soldered to the head 44 by solder 43. Suitable electric lamp manufacturing machinery may be employed for making the lamp in large quantities at low cost.

In FIGS. 4 and 5, the lamp 10a is similar in structure to lamp 10. The central area 22a of face 18a is circular. It may be formed with an outer convex side 23 to define a plano-convex projection lens. This structure permits the center of the lamp face to serve as a concentrated spotlight and the annular periphery of the lamp face will serve for effective wide angle diffusion due to the multiplicity of small lenses 20 there provided.

The clear area 22 of lamp 10 will also serve to project a spotlight, but the beam of the spotlight will diverge somewhat as indicated by dotted lines B, B' in FIG. 3. The central lens 22a by contrast will provide a concentrated spotlight as indicated by converging dotted lines L, L' in FIG. 5.

A particular advantage of the present invention is that the lenses 20 and 23 are all on the external surface and may be molded simultaneously with molding of the envelope. The structure of the lamp is such that it can be made by high speed lamp manufacturing machinery. It is durable in structure and long lasting.

Referring now to the modification of the invention shown in FIGS. 6 and 7 wherein a floodlight lamp 48 only partly formed is shown. The lamp 48 comprises a hollow hermetically sealed glass envelope 50 having a hollow outwardly widening glass reflector 52 of parabolic shape, with an inwardly reflecting surface which is coated with an adhering metallic reflecting coating 54 of aluminum for instance. The narrow rear end of the glass reflector 52 is adjoined by a coaxial glass neck 56 having hermetically sealed thereto a transversely extending coaxial glass stem or glass mount 58.

An electrically heated incandescent filament 60 has two mounting ends 62 metallically joined to two metallic supporting rods 64 which are sealed in a conventional manner, through the glass mount 58. The glass mount is formed with a flange 66 to which the reflector neck 56 is sealed. An exhaust tube 68 is provided for exhausting the air from the envelope 50. After sealing, the remainder of the neck and the remainder of the exhaust tube are discarded in the usual manner.

In accordance with the invention, to the wide outer periphery 70 of the glass reflector 52, there is joined a glass lens 72 which passes the light of the filament 60 as it is reflected by the inward reflecting surface of the reflector 52 toward the exterior of the area which is to be illuminated by a flood of light from the filament 60. The outwardly directed face of the lens 72 is provided over a relatively large radial zone adjoining the outer periphery of the lens with an array of adjacent small, lens-like, round glass projections 74 which distribute and direct and disperse the light passing through the radial lens zone onto the exterior space or area which is to be flooded with the light. Only the central area 76 of the lens and the narrow peripheral lens region of the lens are free of the projections. The central area 76 may be roughened and may be hexagonal in shape.

In FIGS. 8 and 9, a modified form of lens 80 to be joined to the wide periphery of the glass envelope 12 a lamp 10 is shown. The outwardly directed face of the flat body of the lens 80 is provided over a relatively large radial zone adjoining the outer periphery of the lens with a series of spaced concentric annular tooth-like and lens-like projections 82 which distribute and direct and disperse the light pass through the radial lens zone onto the exterior space or area which is to be flooded with the light. Only the central area of the lens indicated at 84 and the narrow peripheral lens region 86 of the lens have no projections 82. The central area 84 is curved and the peripheral region 86 is flat. The opposite inwardly directed face of the body of the lens 80 is roughened as indicated at 88.

The modified form of lens 90 shown in FIGS. 10 and 11 differs from the form of lens 80 shown in FIGS. 8 and 9 merely in that the inwardly directed face of the lens is formed with a plurality of circular recesses 92 concentrically arranged over the entire area of the face except the peripheral edge thereof.

In the modified form of lens 94 shown in FIGS. 12 and 13, the body of the lens has flat outwardly and inwardly directed faces 96 and 98, respectively. At the center of the outwardly directed face 96, the body is raised forming a circular protuberance 100 with a flat outer surface. On the same face, outwardly of the central protuberance 100, there is a series of lens-like arcuate-shaped and tooth-shaped protuberances 102, the lengths of the protuberances increasing progressively from the innermost to the outermost thereof. A circular groove 104 is formed in the same face adjacent the outer periphery thereof.

Referring now to the modified form of lens 106 shown in FIGS. 14, 15 and 16, inclusive, in this form of lens the body is flat with a smooth uninterrupted inwardly directed face 108. In accordance with the invention, the outwardly directed face is formed with a narrow flat area 110 extending from side to side across its center. On both sides of the area 110, the face is formed with straight elongated spaced tooth-shaped projections 112 extending in parallelism to the area 110. Across one end of the projections 112, the face is formed with spaced straight toothed-shaped projections 114 cut across the projections 112 and forming a criss-crossed area on the outwardly projecting face. The peripheral edge 116 of the lens is flat, smooth and uninterrupted.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A lamp structure, comprising a filament adapted to emit light when rendered incandescent, a flaring hollow one-piece glass envelope having a wide end and a narrow neck end, said envelope being generally parabolic in section, said filament being located at the focus of the envelope, an outwardly convex, circular end face integral with the wide end of the envelope, said face having its outer side formed with a plurality of small convex projections defining individual lenses, said projections being disposed in an annular array extending from the periphery of said face radially inwardly thereof to a central clear focal area of the face, a closure for said neck fused thereto, a pair of conductive stems fused in said closure and supporting said filament and extending outwardly of the envelope, and means connecting said stems to an external power supply for energizing said filament, said central clear focal area being formed with a convex portion having a radius of curvature larger than the radius of curvature of the individual small lenses, whereby said convex portion serves to project a converging spot of light centrally of said end face, while said small lenses diffuse light passing therethrough.

2. A lamp structure according to claim 1, wherein said central clear focal area is outwardly convexed relative to the circular end face of the envelope, and is of a lesser radius of curvature than said circular end face.

3. A lamp structure, comprising a filament adapted to emit light when rendered incandescent, a flaring hollow one-piece glass envelope having a wide end and a narrow neck end, said envelope being generally parabolic in section, said filament being located at the focus of the envelope, an outwardly convex, circular end face integral with the wide end of the envelope, said face having its outer side formed with a plurality of small convex projections defining individual lenses, said projections being disposed in an annular array extending from the periphery of said face radially inwardly thereof to a central clear focal area of the face, a closure for said neck fused thereto, a pair of conductive stems fused in said closure and supporting said filament and extending outwardly of the envelope, means connecting said stems to an external power supply for energizing said filament, said central clear focal area being formed with a convex portion having a radius of curvature larger than the radius of curvature of the individual small lenses, whereby said convex portion serves to project a converging spot of light centrally of said end face, while said small lenses diffuse light passing therethrough, and a metal film coating inside said envelope reflecting light to said end face.

References Cited in the file of this patent

UNITED STATES PATENTS

| | | |
|---|---|---|
| 2,177,217 | Howard | Oct. 24, 1939 |
| 2,362,174 | Swanson | Nov. 7, 1944 |
| 2,744,209 | Ferguson | May 1, 1956 |
| 3,048,734 | Linnes | Aug. 7, 1962 |